US012563127B2

(12) United States Patent　　(10) Patent No.:　US 12,563,127 B2
Ikushima　　　　　　　　　　　(45) Date of Patent:　　Feb. 24, 2026

(54) INFORMATION TRANSMISSION METHOD AND COMMUNICATION DEVICE

(71) Applicant: DENSO CORPORATION, Kariya (JP)

(72) Inventor: Keisuke Ikushima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/325,426

(22) Filed: May 30, 2023

(65) Prior Publication Data

US 2023/0300213 A1　　Sep. 21, 2023

Related U.S. Application Data

(63) Continuation of application No. PCT/JP2021/039759, filed on Oct. 28, 2021.

(30) Foreign Application Priority Data

Dec. 3, 2020　(JP) ................................. 2020-201139

(51) Int. Cl.
　　H04L 67/55　　(2022.01)
　　B60W 50/14　　(2020.01)
　　G07C 5/00　　(2006.01)
　　H04W 4/40　　(2018.01)
(52) U.S. Cl.
　　CPC ............. H04L 67/55 (2022.05); B60W 50/14 (2013.01); G07C 5/008 (2013.01); H04W 4/40 (2018.02)
(58) Field of Classification Search
　　CPC ................................. H04L 67/55; H04W 4/44
　　See application file for complete search history.

(56) References Cited

U.S. PATENT DOCUMENTS

| | | | | |
|---|---|---|---|---|
| 12,083,970 | B2 * | 9/2024 | Harata | .............. H04L 12/40019 |
| 12,141,566 | B2 * | 11/2024 | Sakurai | ................. G06F 3/0659 |
| 12,144,050 | B2 * | 11/2024 | Numata | ................... H02J 7/00 |
| 12,153,911 | B2 * | 11/2024 | Harata | ................. B60W 50/14 |
| 2013/0151038 | A1 | 6/2013 | Harumoto et al. | |
| 2015/0025704 | A1 * | 1/2015 | Horihata | ........... H04L 12/40039 |
| | | | | 700/297 |
| 2017/0038595 | A1 | 2/2017 | Kutomi | |
| 2017/0355381 | A1 * | 12/2017 | Miloser | ................. G07C 5/008 |
| 2017/0365107 | A1 * | 12/2017 | Jeong | .................... G07C 5/008 |
| 2018/0063246 | A1 * | 3/2018 | Vangelov | .......... H04L 12/40013 |

(Continued)

FOREIGN PATENT DOCUMENTS

| | | |
|---|---|---|
| JP | 2013-121736 A | 6/2013 |
| JP | 2015202842 A | 11/2015 |

(Continued)

*Primary Examiner* — Douglas B Blair
(74) *Attorney, Agent, or Firm* — Harness, Dickey & Pierce, P.L.C.

(57)　　　　　ABSTRACT

By an information transmission method or a communication device, push information is received from a transmission source positioned in the outside, electronic control unit information related to the in-vehicle electronic control unit to be a notification destination of the push information is grasped, and notification of the push information according to the grasped electronic control unit information is performed. By the information transmission method, a wireless communication device is specified, and the push information is transmitted to the wireless communication device.

8 Claims, 6 Drawing Sheets

(56)          References Cited

U.S. PATENT DOCUMENTS

| | | | |
|---|---|---|---|
| 2019/0149610 A1* | 5/2019 | Jayaraman | B60R 25/24 |
| | | | 713/155 |
| 2019/0173912 A1* | 6/2019 | Ujiie | H04L 12/40 |
| 2019/0230206 A1* | 7/2019 | Halash | H04W 8/24 |
| 2019/0268420 A1* | 8/2019 | Acharya | H04L 63/166 |
| 2019/0327212 A1 | 10/2019 | Nakagawa | |
| 2020/0050442 A1 | 2/2020 | Sakurai et al. | |
| 2020/0125355 A1* | 4/2020 | Aust | H04W 4/44 |
| 2020/0287848 A1 | 9/2020 | Yuki | |
| 2020/0412694 A1* | 12/2020 | Vanderveen | H04L 63/0263 |
| 2021/0157574 A1 | 5/2021 | Harata et al. | |
| 2021/0167988 A1 | 6/2021 | Harata et al. | |
| 2022/0038903 A1* | 2/2022 | Fu | H04W 12/106 |
| 2022/0141317 A1* | 5/2022 | Nakagawa | H04L 67/12 |
| | | | 709/230 |
| 2022/0358769 A1* | 11/2022 | Wang | G06V 40/172 |
| 2023/0254374 A1* | 8/2023 | Harata | G07C 5/008 |
| | | | 711/154 |

FOREIGN PATENT DOCUMENTS

| | | | |
|---|---|---|---|
| JP | 2019192953 A | 10/2019 |
| JP | 2020017221 A | 1/2020 |
| JP | 202028121 A | 2/2020 |
| JP | 2020027637 A | 2/2020 |
| JP | 2020088825 A | 6/2020 |
| JP | 2020145647 A | 9/2020 |

* cited by examiner

FIG. 1

INFORMATION TRANSMISSION METHOD AND COMMUNICATION DEVICE

CROSS REFERENCE TO RELATED APPLICATIONS

The present application is a continuation application of International Patent Application No. PCT/JP2021/039759 filed on Oct. 28, 2021, which designated the U.S. and claims the benefit of priority from Japanese Patent Application No. 2020-201139 filed on Dec. 3, 2020. The entire disclosures of all of the above applications are incorporated herein by reference.

TECHNICAL FIELD

The disclosure according to this specification relates to an information transmission method and a communication device for performing push transmission of information.

BACKGROUND

In a technology of a comparative example, push transmission of a command is performed from a vehicle information server outside the vehicle to an in-vehicle device mounted on a vehicle via a push information server. The in-vehicle device can transmit information to the outside and receive the information from the outside via a communication device.

SUMMARY

By an information transmission method or a communication device, push information is received from a transmission source positioned in the outside, electronic control unit information related to the in-vehicle electronic control unit to be a notification destination of the push information is grasped, and notification of the push information according to the grasped electronic control unit information is performed. By the information transmission method, a wireless communication device is specified, and the push information is transmitted to the wireless communication device.

BRIEF DESCRIPTION OF DRAWINGS

FIG. 1 is a diagram showing an overview of a push delivery system according to one embodiment of the present disclosure.

DETAILED DESCRIPTION

Figure 2:
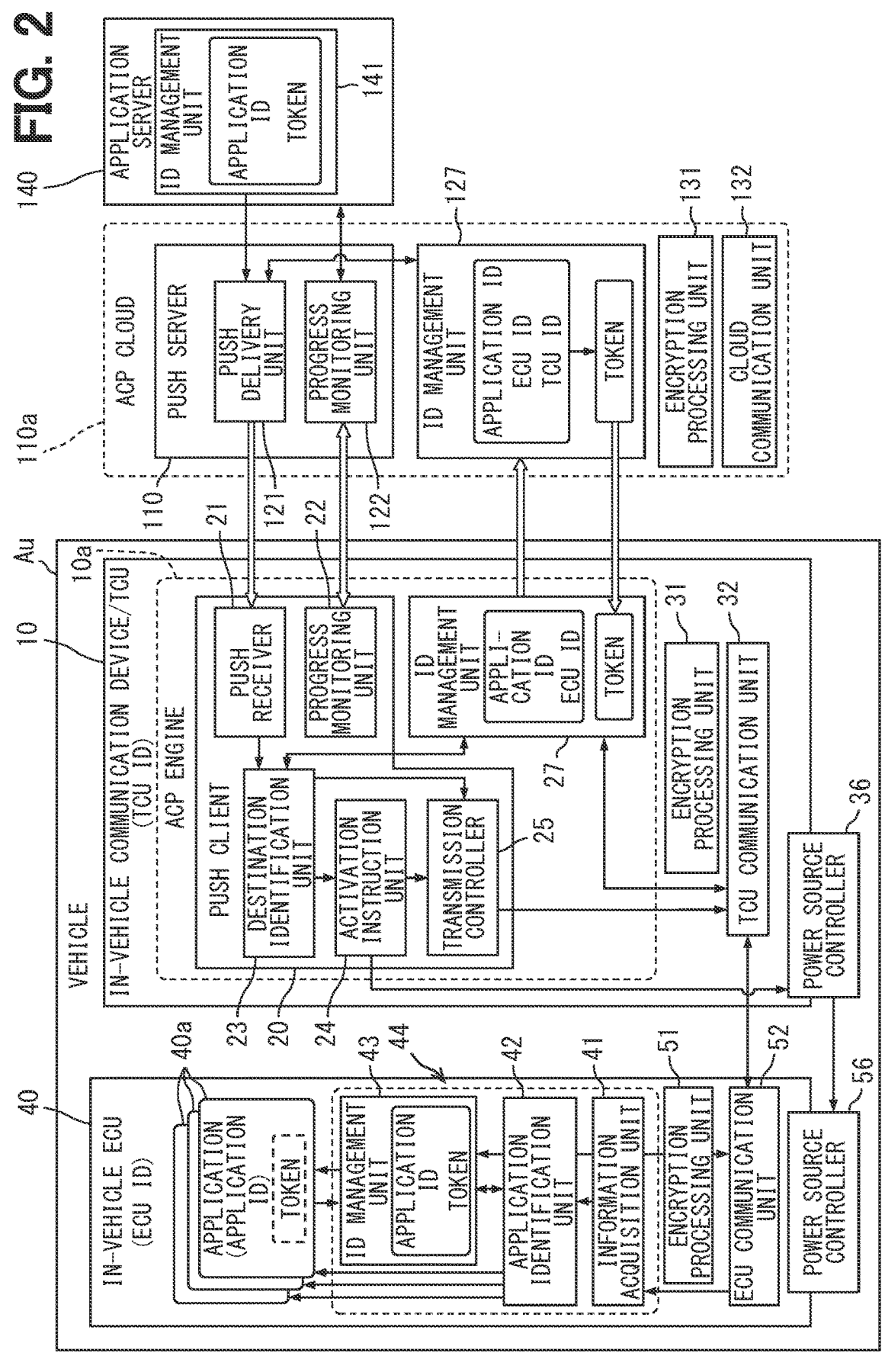
FIG. 2 is a diagram showing configurations of a cloud system and an in-vehicle system.

In recent years, there is a tendency to keep a communication device connected to a network even when a power source of a vehicle is turned off. On the other hand, when the power source of the vehicle is turned off, also a power source of an in-vehicle ECU such as the in-vehicle device of the comparative example is generally turned off. In this case, even when communication with the communication device is possible, transmission of push information to the in-vehicle ECU is substantially impossible. As described above, with the technology of the comparative example, the convenience of push transmission to the in-vehicle ECU may be insufficient.

One example of the present disclosure provides an information transmission method and a communication device capable of improving a convenience of push transmission.

One example embodiment provides an information transmission method for performing push transmission of information by wireless communication from an outside of a vehicle to at least one in-vehicle electronic control unit. The information transmission method includes multiple processes that are executed by at least one process and include: a process of receiving the push information from a transmission source positioned in the outside; a process of grasping electronic control unit information related to an in-vehicle electronic control unit to be a notification destination of the push information; and a process of performing notification of the push information according to the grasped electronic control unit information. Further, another example embodiments provides a communication device that receives, in a vehicle including at least one in-vehicle electronic control unit, information transmitted by push transmission via wireless communication from an outside of the vehicle. The communication device includes: a push receiver that receives push information from a transmission source positioned in the outside; a grasping unit that grasps electronic control unit information related to the in-vehicle electronic control unit to be a notification destination of the push information; and a transmission controller that performs notification of the push information according to the grasped electronic control unit information.

According to these example embodiments, the receiver, which receives the push information from the transmission source outside the vehicle, grasps the ECU information related to the in-vehicle ECU to be the notification destination of the push information, and the notification of the push information according to this ECU information is sent to the in-vehicle ECU. Therefore, the push information can reach the correct notification destination even when the transmission source of the push information does not grasp, in detail, the information related to the in-vehicle ECU. Accordingly, it is possible to improve the convenience of push transmission.

Furthermore, another example embodiment provides an information transmission method for performing push transmission of information via wireless communication from an outside of at least one vehicle of a plurality of vehicles to an in-vehicle electronic control unit mounted on the at least one vehicle. The method includes multiple processes that are executed by at least one processor and include: a process of specifying a wireless communication device associated with the at least one vehicle to be a transmission destination of push information based on request information acquired from a request destination of the push transmission; and a process of transmitting the push information to the wireless communication device having a function of specifying the in-vehicle electronic control unit to be a notification destination of the push information.

According to this example embodiment, the transmission source, which transmits the push information, specifies the wireless communication device associated with the vehicle to be the transmission destination of the push information based on the request information acquired from the request source of the push transmission. In addition, the wireless communication device that receives the push information can specify the in-vehicle ECU that is the notification destination of the push information. Therefore, even when the request source of the push transmission does not grasp, in detail, the information about the vehicle and its system configuration, the push information can reach the correct destination. Accordingly, it is possible to improve the convenience of push transmission.

The reference numerals in the parentheses in claims are just examples of the correspondence with the specific components in the embodiments, and do not limit the scope of the present disclosure.

Figure 1:
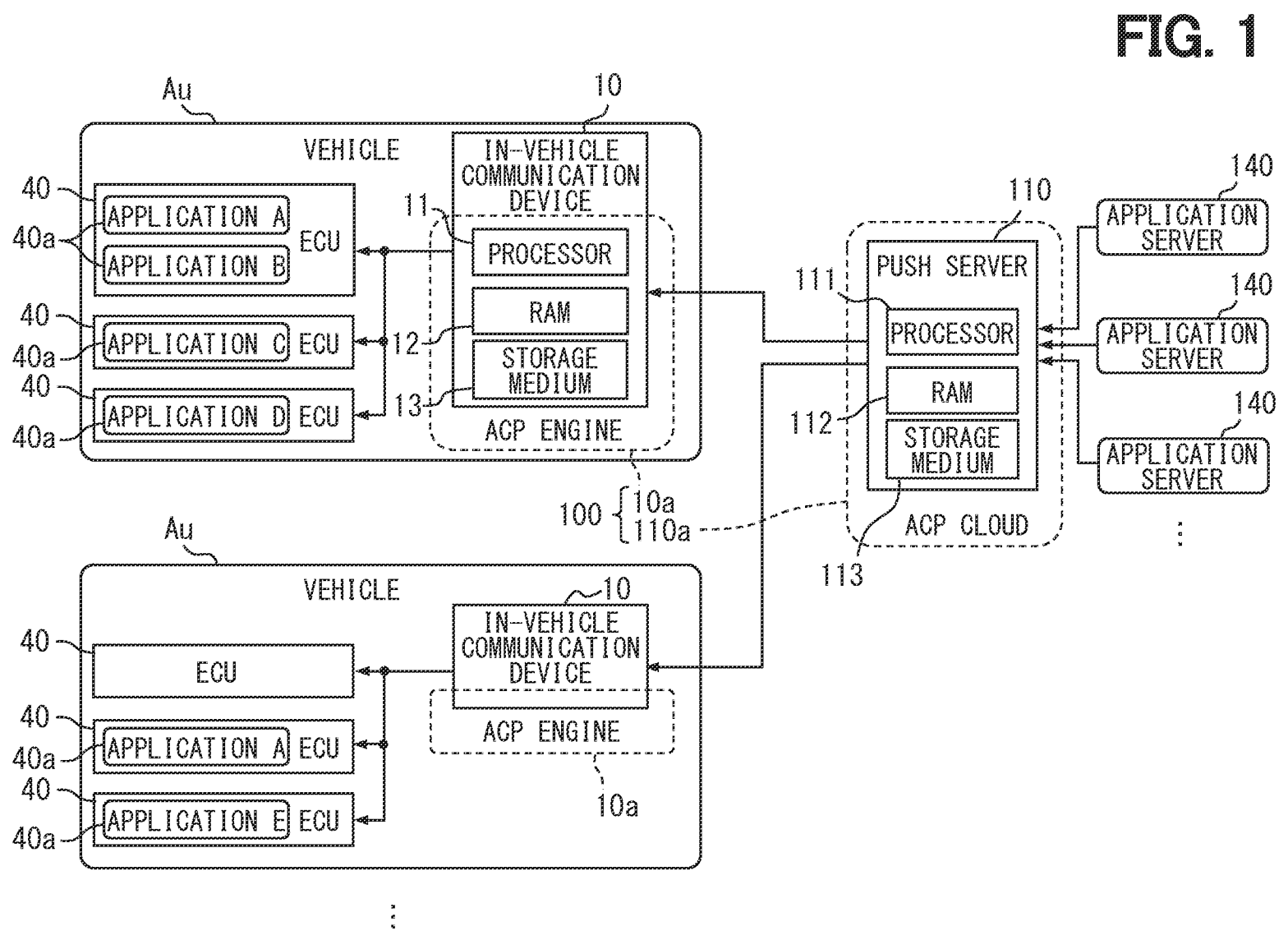

A push delivery system according to one embodiment of the present disclosure are shown in FIGS. 1 and 2, and can perform push transmission of information from an application server 140 placed for a cloud to an application 40a operating on an in-vehicle ECU 40. As the push delivery system, an automotive wireless communication platform 100 is employed. The automotive wireless communication platform 100 enables secure connections between the application server 140 and the application 40a anytime, anywhere. Specifically, a power source of the in-vehicle ECU 40 is turned off when, for example, a vehicle Au is parked. Further, each vehicle Au has a different configuration of an in-vehicle system including the in-vehicle ECU 40. The automotive wireless communication platform 100 hides such a difference in the power source state and the system configuration from the application server 140. As a result, a pseudo-always-on connection is implemented as if all the in-vehicle ECUs 40 were always connected to the network outside the vehicle for each vehicle Au.

Hereinafter, details of the cloud system in which the automotive wireless communication platform 100 is provided and the in-vehicle system of each vehicle Au will be described in order.

In the cloud, multiple application servers 140, at least one push server 110, and the like are provided as a system for implementing services compatible with push delivery for in-vehicle applications.

The application server 140 is a push transmission request source. The application server 140 includes an ID management unit 141. The ID management unit 141 manages at least one of an application ID or a token (described later) that identifies the application 40a. When the application server 140 transmits a request of push transmission to the push server 110, the application server 140 provides, as request information, the application ID or the token together with a body of a message to be transmitted to the application 40a. In the present embodiment, the token is mainly used as the request information. The application server 140 reads the token associated with a transmission destination of the push information from the ID management unit 141. The token serves as key information for determining the destination of the push information in the push server 110, the in-vehicle system, and the like.

The push server 110 is the transmission source of the push transmission. The push server 110 is connected to multiple application servers 140. The push server 110 can exchange information with an in-vehicle communication device 10 mounted on the vehicle Au by wireless communication via a mobile communication network. The push server 110 can communicate with the in-vehicle communication device 10 not only by a mobile phone line but also by wireless communication such as Wi-Fi (registered trademark) and V2X. Based on a delivery request from the application server 140, the push server 110 performs the push transmission of information by wireless communication to the in-vehicle ECU 40 mounted on at least one of the multiple vehicles Au.

The push server 110 is an arithmetic processing device that mainly includes a processor 111, a RAM 112, a storage medium 113, and the like. The push server 110 has an encryption processing unit 131 and a cloud communication unit 132. The encryption processing unit 131 provides functions such as authentication of a communication partner, encryption of communication contents, and detection of falsification by TLS (Transport Layer Security) processing or the like. The encryption processing unit 131 enables the push server 110 to securely communicate with each application server 140 and each in-vehicle communication device 10. The cloud communication unit 132 provides a data communication function. Specifically, the cloud communication unit 132 can implement data communication using TCP/IP, UDP/IP, and other protocols. The push server 110 performs data communication with each application server 140 and each in-vehicle communication device 10 via the cloud communication unit 132.

The push server 110 is a server device included in an ACP (Automotive Communication Platform) cloud 110a that implements cloud functions of the automotive wireless communication platform 100. The push server 110 implements main functions of the ACP cloud 110a. The ACP cloud 110a selects a vehicle Au (in-vehicle communication device 10) to be the transmission destination, based on the push information delivery request from the application server 140, and performs the push transmission of information to the selected vehicle Au. The push server 110 implements the functions of the ACP cloud 110a by causing the processor 111 to execute programs stored in the storage medium 113. The push server 110 includes a push delivery unit 121, a progress monitoring unit 122, an ID management unit 127, and the like as functional units of the ACP cloud 110a. The ID management unit 127 may be implemented in an arithmetic operation device (hardware) different from the push server 110.

The push delivery unit 121 cooperates with the cloud communication unit 132 to deliver push information to the in-vehicle communication device 10 based on a push information delivery request from the application server 140. The push delivery unit 121 uses a token acquired as request information from the application server 140 as a key, and specifies the in-vehicle communication device 10 to which the push information is to be transmitted, based on the ID information managed by the ID management unit 127.

The push delivery unit 121 can repeat transmission of push information to the in-vehicle communication device 10 within a predetermined period. More specifically, the push delivery includes a scene in which an immediate response from the in-vehicle system is required, and a scene in which it is sufficient for the push information to reach the notification destination. Therefore, a delivery time limit (hereinafter referred to as a retry time limit) is set for the push delivery according to the requested response. When the transmission of the push information to the in-vehicle communication device 10 fails, the push delivery unit 121 repeats the transmission of the push information to the in-vehicle communication device 10 within a predetermined time before exceeding the retry time limit, based on the retry time limit set according to the content of the push information. When the retry time limit has passed while the transmission of the push information to the in-vehicle communication device 10 has failed, the push delivery unit 121 determines that the push delivery has failed, and ends the transmission of the push information.

The progress monitoring unit 122 monitors a connection state of the in-vehicle communication device 10 to the network and a progress state of push transmission. For example, when the in-vehicle communication device 10 is not connected to the network, the progress monitoring unit 122 notifies the application server 140, which is the source of the delivery request, that the push delivery has failed (see S44 in FIG. 5). When the delivery of the push information to the notification destination fails in the in-vehicle system that is the transmission destination of the push information, the progress monitoring unit 122 receives reason information associated with the failure from the in-vehicle communication device 10 (progress monitoring unit 22 described later), in addition to the notification of the delivery failure. The progress monitoring unit 122 notifies the application server 140, which is the delivery request source, that the push delivery has failed based on the notification and reason information received from the in-vehicle communication device 10 (see S52 in FIGS. 5 and S68 in FIG. 6).

The ID management unit 127 manages information indicating which in-vehicle ECU 40 among the multiple vehicles Au has the application 40*a*. Specifically, the ID management unit 127 manages an application ID, an ECU ID, and a TCU ID in association with each other. The application ID, ECU ID and TCU ID are synchronized with the information registered in the in-vehicle communication device 10. The application ID is identification information that identifies the application 40*a*. The ECU ID is identification information that identifies the in-vehicle ECU 40. The TCU ID is identification information that identifies the in-vehicle communication device 10 (vehicle Au). The application ID, ECU ID, and TCU ID registered in the ID management unit 127 are synchronized with information registered in the in-vehicle communication device 10 (ID management unit 27 described later).

The ID management unit 127 manages combinations of the application ID, the ECU ID, and the TCU ID by using a unique ID called the token. The token is information that substitutes for linking the application 40*a*, the in-vehicle ECU 40 and the in-vehicle communication device 10. Even when the same application 40*a* is installed in the multiple vehicles Au and these application IDs are the same, the ACP cloud 110*a* can set, as the notification destination, the application 40*a* installed in the specific in-vehicle ECU 40 of the specific vehicle Au, by using the token. The ID management unit 127 cooperates with the cloud communication unit 132 and notifies the in-vehicle communication device 10 of the issued token.

The ID management unit 127 can invalidate and reissue the token, and manages validity and invalidity of the token. Thereby, the token has an expiration date and can be discarded. In one example, when a user of a vehicle Au such as a shared car shared by multiple user is changed, the ID management unit 127 invalidates the existing token issued by the user and issues a new token for a new user.

The in-vehicle system installed in each vehicle Au includes at least one in-vehicle communication device 10, multiple in-vehicle ECUs 40, and the like.

The in-vehicle communication device 10 is called a TCU (Telematics Control Unit) or a DCM (Data Communication Module) or the like, and enables wireless communication between the in-vehicle system and the outside. The in-vehicle communication device 10 is a destination of the push transmission, and receives the push information from the push server 110, which is a transmission source outside the vehicle, through various wireless communications such as a mobile phone line, Wi-Fi, and V2X. The in-vehicle communication device 10 is connected to multiple in-vehicle ECUs 40 via the in-vehicle network. The in-vehicle communication device 10 executes a process of providing the push information received from the push server 110 to the in-vehicle ECU 40 and the application 40*a*, which are notification destinations of the push information.

The in-vehicle communication device 10 is a control device that mainly includes a microcontroller having a processor 11, a RAM 12, a storage medium 13, and the like. The in-vehicle communication device 10 further includes an encryption processing unit 31 that provides an encryption processing function, and a TCU communication unit 32 that provides a data communication function. The encryption processing unit 31 allows the in-vehicle communication device 10 to perform secure communication with the push server 110 and each in-vehicle ECU 40. The TCU communication unit 32 allows the in-vehicle communication device 10 to transmit and receive data to and from the push server 110 and each in-vehicle ECU 40. The TCU communication unit 32 can implement data communication using TCP/IP, UDP/IP, and other protocols.

The in-vehicle communication device 10 can maintain an online state where the in-vehicle communication device 10 is connected to the network even when the main power source of the vehicle Au, specifically, the so-called ignition, is turned off, such as during parking, for example. In the in-vehicle communication device 10, an ACP engine 10*a* implementing the functions of the automotive wireless communication platform 100 operates. In the vehicle Au including one or more vehicle-mounted ECUs 40, the ACP engine 10*a* receives information push-transmitted via wireless communication from the outside of the vehicle Au, and provides the received push information to the in-vehicle ECU 40 that is the notification destination. The in-vehicle communication device 10 implements the functions of the ACP engine 10*a* by causing the processor 11 to execute a program stored in the storage medium 13. The in-vehicle communication device 10 includes a push receiver 21, a progress monitoring unit 22, a destination identification unit 23, an activation instruction unit 24, a transmission controller 25, and the like, as functional units of the ACP engine 10*a*.

The push receiver 21, the progress monitoring unit 22, the destination identification unit 23, and the activation instruction unit 24 are functional units that operate as push clients. The push receiver 21 receives push information from the push delivery unit 121 that is the transmission source.

The progress monitoring unit 22 monitors a connection state via wireless communication with the push server 110 and a progress state of push transmission in the in-vehicle network. The progress monitoring unit 22 cooperates with the progress monitoring unit 122 of the push server 110 to enable mutual connection confirmation (hereinafter referred to as alive monitoring) between the in-vehicle communication device 10 and the push server 110. In addition, when the push information does not reach the notification destination, the progress monitoring unit 22 notifies the transmission source of the failure of the push transmission together with reason information associated with the failure. In one example, when the application 40*a* or the in-vehicle ECU 40, which is the notification destination, has disappeared from the in-vehicle network, the progress monitoring unit 22 notifies the push server 110, which is the transmission source, of the failure of the push delivery in association with such reason information (see S47 in FIG. 5). When the provision of the push information to the application 40a fails, the progress monitoring unit 122 notifies the push server 110, which is the transmission source, of the failure of push delivery in association with such reason information (see S67 in FIG. 6).

The destination identification unit 23 grasps ECU information related to the in-vehicle ECU 40 which is the notification destination of the push information. Specifically, the destination identification unit 23 grasps destination information and status information as ECU information. The destination information is information specifying the in-vehicle ECU 40 as the notification destination of the push information from among the multiple in-vehicle ECUs 40. The destination identification unit 23 acquires destination information by referring to information managed by the ID management unit 27, specifically each ID information or token. The status information is information indicating the power source state (on-off state) of the in-vehicle ECU 40 specified as the destination. More specifically, the off-state of the power source here means a state in which the in-vehicle ECU 40 has transitioned from an active state to a sleep state or the like due to an off-state of the ignition or the like. At this time, communication by an ECU communication unit 52 (described later) becomes impossible while the in-vehicle ECU 40 can receive the activation request in a power saving state.

The activation instruction unit 24 activates the vehicle ECU 40 to turn on the power source (causes the in-vehicle ECU 40 to be in an activation state) when the power source of the in-vehicle ECU 40 specified as the destination is in the off-state, based on the status information grasped by the destination identification unit 23. The activation instruction unit 24 cooperates with a power source controller 36 to output a signal (activation request) for activation control to turn on the power source (activation state) toward the target in-vehicle ECU 40.

The transmission controller 25 selects the in-vehicle ECU 40 to be subjected to push transmission based on the destination information grasped by the destination identification unit 23. The transmission controller 25 cooperates with a TCU communication unit 32 to notify the selected target in-vehicle ECU 40 of push information. When the power source of the in-vehicle ECU 40 is turned off, the transmission controller 25 waits until the power source of the in-vehicle ECU 40 is turned on by the activation process. The transmission controller 25 provides the push information to the in-vehicle ECU 40 whose power source is in the on-state.

The ID management unit 27 manages which in-vehicle ECU 40 has the target application 40a that is the notification destination of the push information. The application ID, the ECU ID, the token, and the like are registered in the ID management unit 27. The ID management unit 27 acquires, from each in-vehicle ECU 40, an application ID associated with each application 40a and an ECU ID linked to each in-vehicle ECU 40. The ID management unit 27 notifies the ID management unit 127 of the ACP cloud 110a of the acquired application ID and the ECU ID together with the TCU ID associated with the in-vehicle communication device 10. Through such a process, the ID information registered in each of the ID management units 27 and 127 is synchronized. The ID management unit 27 receives the token issued by ID management unit 127. The ID management unit 27 provides the received token to the in-vehicle ECU 40 associated with the token.

The in-vehicle ECU 40 can execute one or more applications 40a. The application 40a serves as the notification destination of the push information delivered from the push server 110. The in-vehicle ECU 40 corresponds to an end ECU. Unlike the in-vehicle communication device 10, the in-vehicle ECU 40 is basically turned off in order to reduce power consumption when the power source of the vehicle Au is turned off. At this time, the in-vehicle ECU 40 is also disconnected from the network. The application 40a may not be installed in some of the in-vehicle ECUs 40. Further, the in-vehicle communication device 10 may be provided in an in-vehicle system as a configuration that also serves as the in-vehicle ECU 40, and may be capable of executing the application 40a.

The in-vehicle ECU 40 is a control device that mainly includes a microcontroller, and includes an encryption processing unit 51, an ECU communication unit 52 and a power source controller 56. The encryption processing unit 51 provides an encryption processing function and establishes secure communication between the in-vehicle ECU 40 and the in-vehicle communication device 10. The ECU communication unit 52 transmits and receives data to and from the TCU communication unit 32. The power source controller 56 is a controller that switches the on-off state of the power of the in-vehicle ECU 40. Upon receiving the power-on request from the power source controller 36, the power source controller 56 switches the power source of the in-vehicle ECU 40 from the off-state to the on-state.

The in-vehicle ECU 40 includes an information acquisition unit 41, an application identification unit 42, an ID management unit 43, and the like as functional units of an ACP client 44 that relays data between the ACP engine 10a and the application 40a.

The information acquisition unit 41 cooperates with the ECU communication unit 52 to acquire push information transmitted from the in-vehicle communication device 10. The push information acquired by the information acquisition unit 41 is associated with the token (or application ID).

When the information acquisition unit 41 acquires the push information, the application identification unit 42 identifies the application 40a, to which the push information is provided, from among the plurality of applications 40a. The application identification unit 42 refers to the application ID and the token registered in the ID management unit 43, extracts registered information that matches the token associated with the push information, and thereby identifies the application 40a, to which the push information is provided.

The application ID and the token for identifying the application 40a are registered in the ID management unit 43 so that the application identification unit 42 can refer to them. The application ID is information issued by each application 40a. The ID management unit 43 acquires a unique application ID from each application 40a, and notifies the ACP engine 10a of the application ID through the ECU communication unit 52. The token is information provided from the ACP cloud 110a. The ID management unit 43 acquires the token provided to the ACP engine 10a through the ECU communication unit 52.

Next, the details of each sequence process executed between the cloud system and each in-vehicle system will be described below based on FIGS. 3 to 6 and with reference to FIGS. 1 and 2.

Figure 3:
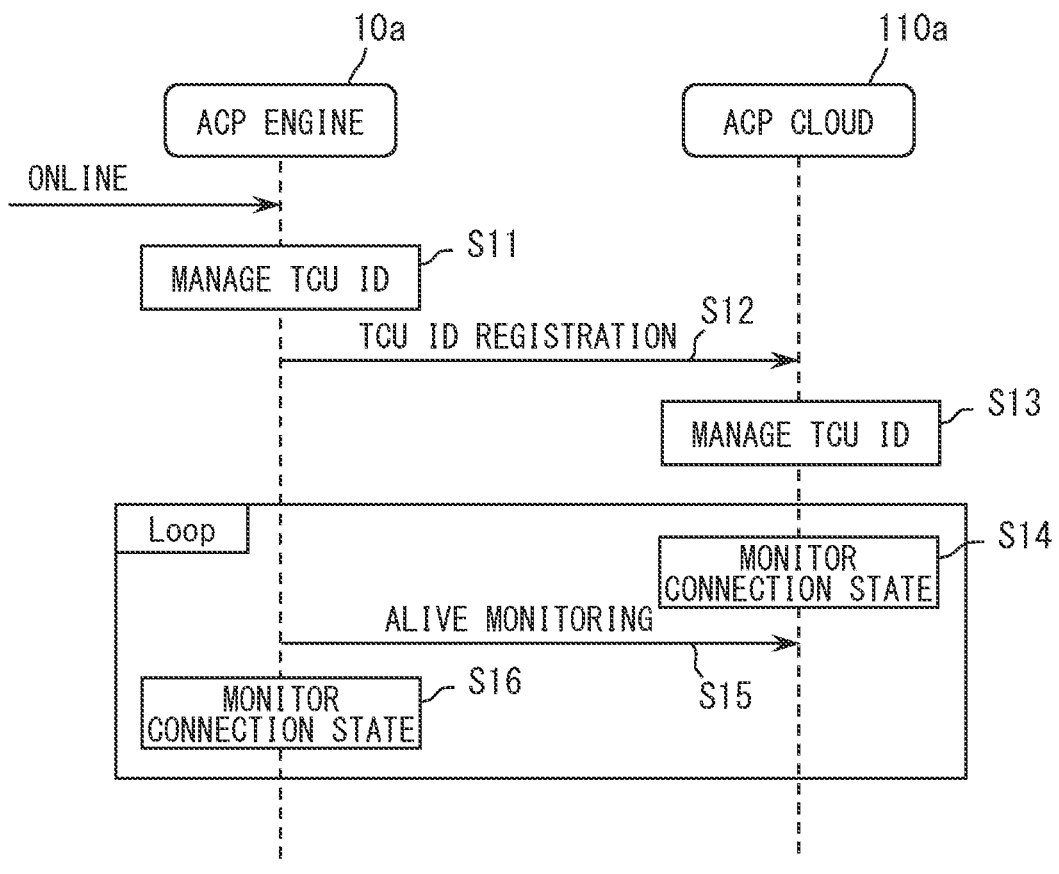
FIG. 3 is a sequence diagram showing details of a registration sequence for registering an in-vehicle communication device with a push server.

A registration sequence of the TCU ID is shown in FIG. 3, and is executed between the ACP engine 10a and the ACP cloud 110a, for example, when the in-vehicle communication device 10 is activated and first becomes in an online state. Specifically, when the in-vehicle communication device 10 mounted on the new vehicle Au is activated, when the replaced in-vehicle communication device 10 is activated for the first time, or when the state of the in-vehicle communication device 10 changes from the communication impossible state to the possible state, the registration sequence is started by the ACP engine 10*a*. The registration sequence enables the alive monitoring between the in-vehicle communication device 10 and the push server 110.

In S11 and S12, the ACP cloud 110*a* is notified of the unique TCU ID associated with the in-vehicle communication device 10 from the online ACP engine 10*a*. Specifically, in S11, the TCU ID of the in-vehicle communication device 10 is read as the management process of the TCU ID. In S12, the ACP cloud 110*a* is requested to register the TCU ID read in S11.

In S13, the ACP cloud 110*a* executes the management process of the TCU ID based on the registration request acquired in S12. Specifically, in S13, the TCU ID is associated with the connection destination information and registered in the ID management unit 127.

In S14 to S16, the alive monitoring is performed. In the alive monitoring, whether the in-vehicle communication device 10 is online is monitored. Specifically, in S14 and S16, the ACP cloud 110*a* and the ACP engine 10*a* monitor each other's connection status. In S15, a predetermined control packet for the alive monitoring is transmitted from the ACP engine 10*a* to the ACP cloud 110*a*. Each process of S14 to S16 is repeatedly executed at regular time intervals.

Figure 4:
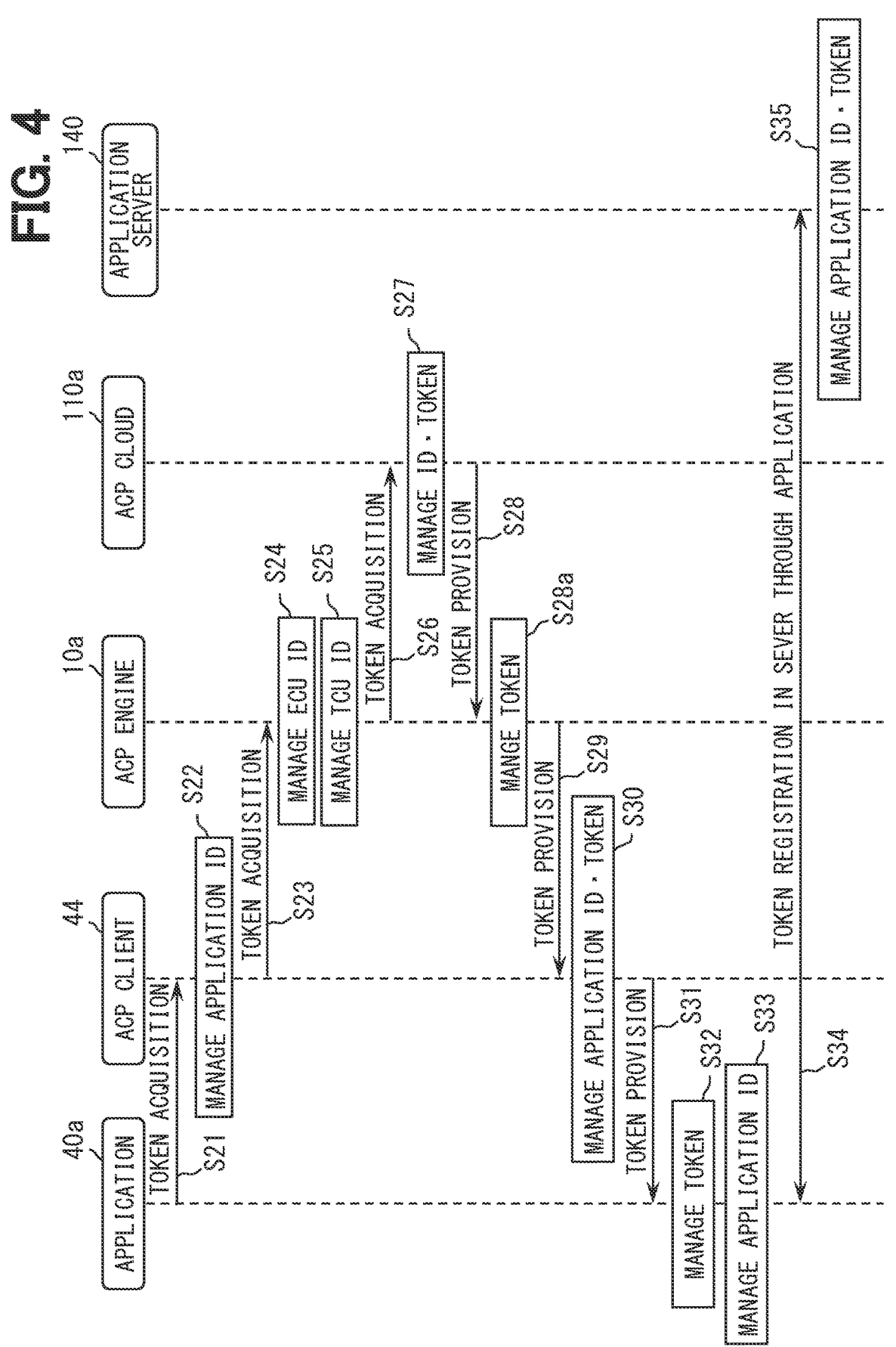
FIG. 4 is a sequence diagram showing details of a token provision sequence for associating an application and an application server.

A token provision sequence shown in FIG. 4 is performed, for example, when the application 40*a* is installed in the in-vehicle ECU 40, or when the user of the vehicle Au is changed, or the like. Synchronization of multiple ID information and tokens managed by each of the ID management units 27, 43, 127, and 141 is achieved by the token provision sequence. According to the token provision sequence, end-to-end association between the application server 140 and the application 40*a* is completed.

In S21, the application 40*a* transmits a message requesting acquisition of a token to the ACP client 44. In S21, the ACP client 44 is notified of the application ID.

In S22, as an application ID management process, the ACP client 44 associates the application ID with the application 40*a* and registers it in the ID management unit 43. When the issued token has already been registered in the ACP client 44, the ACP client 44 may associate the application ID with the token and then provide the token to the application 40*a*.

In S23, the ACP client 44 transmits a message requesting acquisition of the token to the ACP engine 10*a*. In S23, in addition to the application ID notified from the application 40*a*, the ECU ID associated with the in-vehicle ECU 40 is notified to the ACP engine 10*a*.

In S24, as an ECU ID management process, the ACP engine 10*a* registers the application ID and the ECU ID in the ID management unit 27 while associating them with each other. Furthermore, in S25, as a TCU ID management process, the ACP engine 10*a* registers the TCU ID in the ID management unit 27 while associating the TCU ID with the application ID and the ECU ID. By associating multiple IDs with each other in the above S21 to S25, the ACP engine 10*a* can identify the application 40*a* that is the notification destination of the push information when the push information is received. As a result, the difference in the ECU configuration of the in-vehicle system for each vehicle is hided from the ACP cloud 110*a*.

In S26, the ACP engine 10*a* transmits a message requesting acquisition of the token to the ACP cloud 110*a*. In S26, the ACP cloud 110*a* is notified of the application ID, ECU ID and TCU ID.

In S27, as an ID management process, the application ID, ECU ID, and TCU ID are registered in the ID management unit 127 in a state where the application ID, ECU ID, and TCU ID are associated with each other. In addition, in S27, the ID management unit 127 of the ACP cloud 110*a* issues a token as a unique ID associated with a combination of IDs that are identification information for identifying the application 40*a*, the in-vehicle ECU 40, and the in-vehicle communication device 10, respectively. After issuing the token, the ID management unit 127 continues to manage the association between each ID and the token.

In S28, the token issued in S27 is provided from the ACP cloud 110*a* to the ACP engine 10*a*. The ACP engine 10*a* stores the token acquired from the ACP cloud 110*a* in the ID management unit 27. In S29, the token is provided from the ACP engine 10*a* to the ACP client 44.

In S30, the ACP client 44 associates the token with the application ID and registers it in the ID management unit 43 as management processes of the application ID and the token. In S31, the token is provided from the ACP client 44 to the application 40*a*.

In S32, in the token management process, the application 40*a* associates the token with the application ID. In S33, in the application ID management process, the application 40*a* manages the association between the application ID and the token.

In S34, the application ID and the token are notified to the specific application server 140 involved in service provision through the application 40*a*. Thereby, the association of the services between the application 40*a* and the application server 140 is completed. In S35, the application server 140 registers the application ID and the token notified from the application 40*a* in the ID management unit 141 in a state where the application ID and the token are associated with each other, in the management processes of the application ID and the token. By sharing the token, the application server 140 becomes ready for push transmission to the destination according to the token. On the other hand, the application 40*a* becomes ready to receive the push service.

Figure 5:
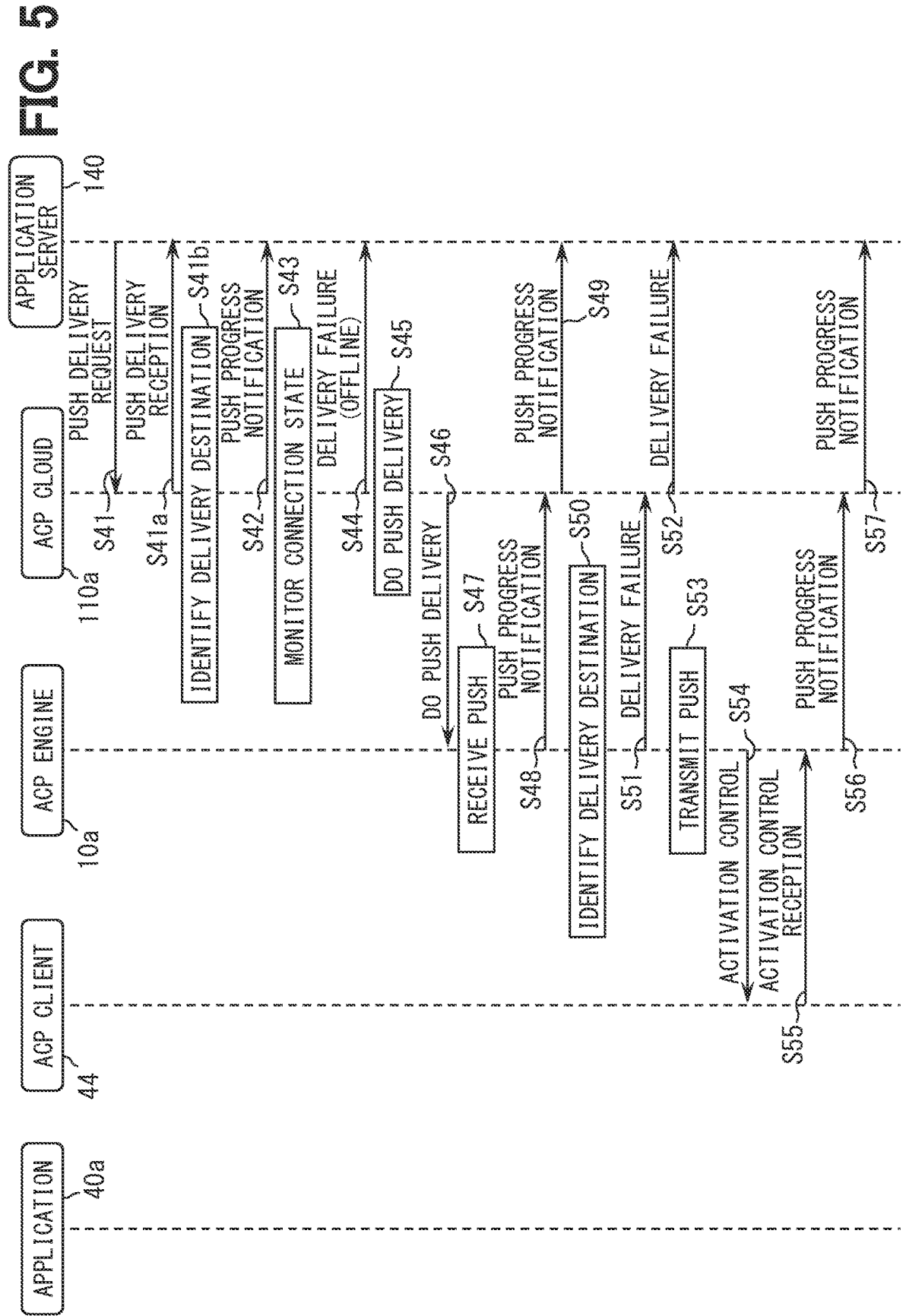
FIG. 5 is a sequence diagram showing, together with FIG. 6, details of a push delivery sequence for performing push delivery from the application server to the application.
Figure 6:
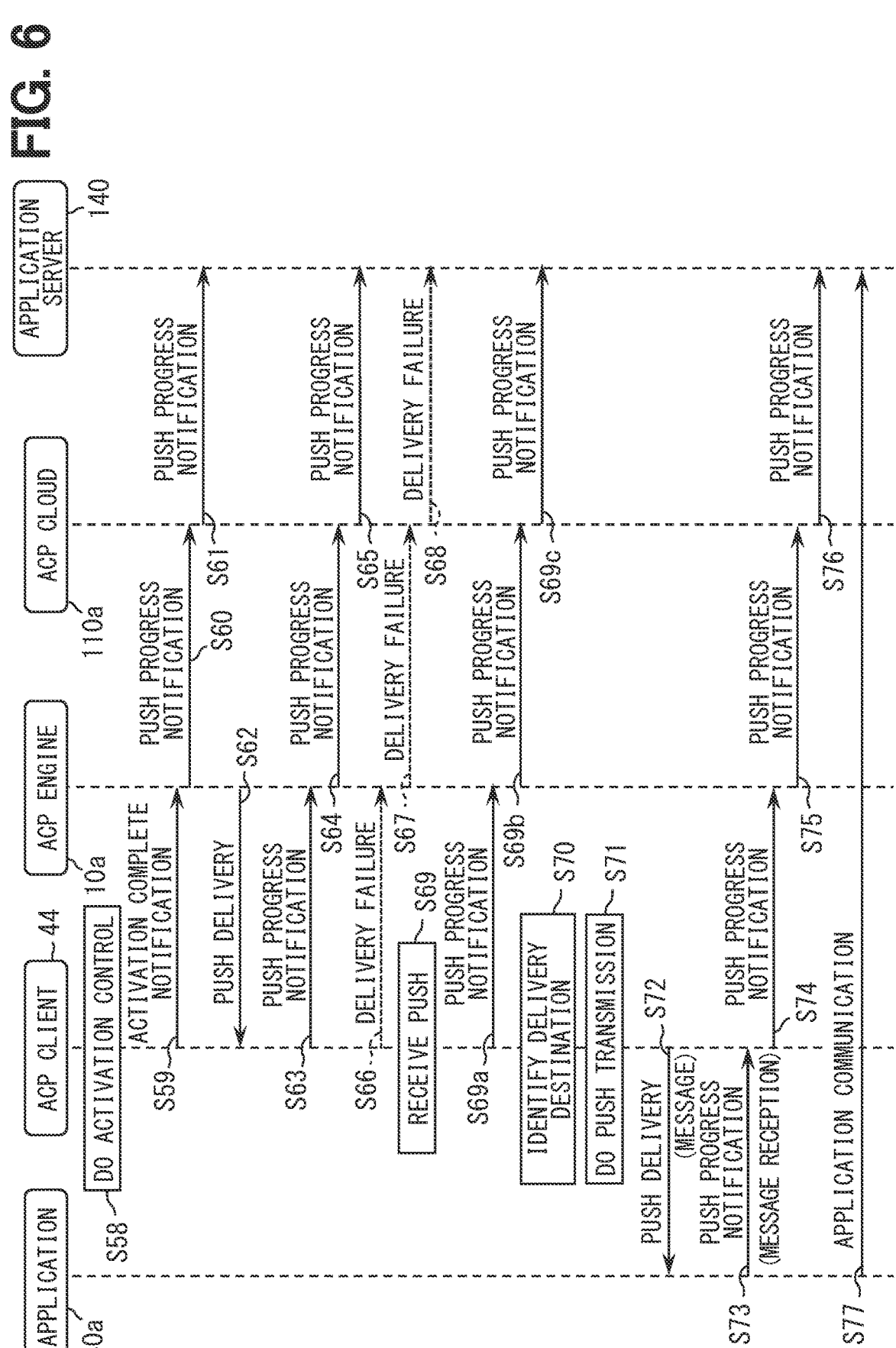
FIG. 6 is a sequence diagram showing the details of the push delivery sequence together with FIG. 5.

The push delivery sequences shown in FIGS. 5 and 6 start when the application server 140 determines to perform push delivery. Push information is delivered to the application 40*a* designated by the application server 140 as the notification destination by the push delivery sequence. In addition, in the push delivery sequence, the progress monitoring unit 22 of the ACP engine 10*a* sequentially notifies the progress monitoring unit 122 of the ACP cloud 110*a* of the progress. Then, the application server 140 is notified of the progress of the push delivery from the ACP cloud 110*a*. The application server 140 can grasp how far the push information has reached and whether the push transmission to the application 40*a* has been successful, based on the messages sequentially returned in the push delivery process. When the service does not require the grasp of the push delivery progress, the application server 140 may arbitrarily omit the grasp of the push delivery progress.

In S41, the application server 140 transmits a message requesting push delivery to the ACP cloud 110*a*. In S41, the application server 140 requests the ACP cloud 110*a* to perform push delivery using the token as a key. In S41*a*, the ACP cloud 110*a* notifies the application server 140 of a message indicating that the push delivery has been accepted. In S41*b*, the delivery destination of the push delivery is identified. In this S41*b*, the ACP cloud 110*a* identifies the in-vehicle communication device 10 (ACP engine 10*a*) associated with the vehicle Au, which is the transmission destination of the push information, based on the token acquired as request information from the application server 140 that is the request source of the push transmission. Specifically, the ACP cloud 110*a* refers to the storage information of the ID management unit 127, and extracts the in-vehicle communication device 10 of the TCU ID associated with the acquired token. In S42, the ACP cloud 110*a* sends back to the application server 140, a progress notification that the in-vehicle communication device 10, which is the delivery destination of the push delivery, has been specified.

In S43, the ACP cloud 110*a* monitors the connection status of the in-vehicle communication device 10 specified in S41*b*, and determines whether the in-vehicle communication device 10 is online. When the in-vehicle communication device 10 is offline, the ACP cloud 110*a* notifies the application server 140 of a message indicating push delivery failure in S44. In this case, the ACP cloud 110*a* also notifies the application server 140 of the delivery failure reason information indicating that the in-vehicle communication device 10 is offline. As described above, the connection between the in-vehicle communication device 10 and the network may be put on standby until a predetermined retry time limit elapses.

On the other hand, when the in-vehicle communication device 10 is online, the delivery of the push information to the in-vehicle communication device 10 starts in S45 and S46. In S46, the token is transmitted to at least the ACP engine 10*a*. Then, in S47, the ACP engine 10*a* receives the message body and token of the push information transmitted from the ACP cloud 110*a* in S46. In S48, the ACP engine 10*a* sends back to the ACP cloud 110*a*, a message indicating that the delivery of the push information has been accepted as a push delivery progress notification. In S49, the application server 140 is notified of the progress of the push delivery from the ACP cloud 110*a*.

In S50, ECU information related to the in-vehicle ECU 40, which is the notification destination of the push information, is grasped, and the destination of the push delivery is identified. In S50, the ACP engine 10*a* refers to the storage information of the ID management unit 27, and identifies the in-vehicle ECU 40 of the ECU ID associated with the received token. When the received token exists in the storage information of the ID management unit 27, the ACP engine 10*a* receives destination information specifying the in-vehicle ECU 40 to be the notification destination of the push information from among the multiple in-vehicle ECUs 40, and status information indicating the power source state of the specified in-vehicle ECU 40.

On the other hand, when the received token does not exist in the storage information of the ID management unit 27, the ACP engine 10*a* notifies the ACP cloud 110*a* of a message indicating the push delivery failure in S51. In this case, the ACP engine 10*a* also notifies the ACP cloud 110*a* of the delivery failure reason information indicating that the push delivery destination is unknown. The ACP cloud 110*a* transfers the failure notification and reason information received from the ACP engine 10*a* to the application server 140 in S52. For example, when the application 40*a* is changed or deleted, or when the user is changed or the like, the destination of the push delivery becomes unknown.

In S53, the ACP engine 10*a* performs notification of push information corresponding to the ECU information grasped in S50. In S53, the push information is provided to the ACP client 44 of the specified in-vehicle ECU 40. When the power source of the specified in-vehicle ECU 40 is in the off-state, the ACP engine 10*a* transmits an activation control start request message to the in-vehicle ECU 40 in S54. The transmission of the activation control start message corresponds to an activation process for activating the in-vehicle ECU 40.

In S55, the in-vehicle ECU 40 that has received the activation control start request message returns, to the ACP engine 10*a*, a message that the activation control has been accepted. In S56 and S57, the ACP cloud 110*a* and the application server 140 are sequentially notified of a message indicating the activation start of the in-vehicle ECU 40 as the push delivery progress notification.

In S58, the activation control by the power source controller 56 starts, and the power source of the in-vehicle ECU 40 is turned on (in the activation state). Thereby, the in-vehicle ECU 40 becomes substantially communicable. In S59, the ACP client 44 transmits a message indicating that the power source has been turned on (completion of activation) to the ACP engine 10*a*. In S60 and S61, the ACP cloud 110*a* and the application server 140 are sequentially notified of a message indicating that the power source of the in-vehicle ECU 40 is turned on, as a push delivery progress notification.

In S62, the ACP engine 10*a* transmits push information to the ACP client 44 of the in-vehicle ECU 40 of which power source has been turned on by the activation process. In S62, the token is transmitted to at least the ACP client 44. In S63, the ACP client 44 returns, to the ACP engine 10*a*, push delivery progress notification that is a message indicating that the push delivery has been accepted. In S64 and S65, the ACP cloud 110*a* and the application server 140 are sequentially notified of a message indicating that the push delivery has been accepted by the ACP client 44.

Here, when the push delivery from the ACP engine 10*a* to the ACP client 44 fails, the ACP client 44 notifies the ACP engine 10*a* of a message indicating the push delivery failure in S66. In this case as well, the ACP client 44 notifies the ACP engine 10*a* of the delivery failure reason information indicating that the destination of the push delivery is unknown. In S67 and S68, the failure notification and reason information returned to the ACP engine 10*a* are notified to the ACP cloud 110*a* and the application server 140 in order.

In S69, the ACP client 44 completes receiving the message body of the push information. In S69*a*, the ACP client 44 returns, to the ACP engine 10*a*, a push distribution progress notification that is a message indicating completion of the push reception. In S69*b* and S69*c*, the message indicating the completion of the push reception by the ACP client 44 is notified to the ACP cloud 110*a* and the application server 140 in order.

In S70, the delivery destination of the push delivery is identified. In S70, the ACP client 44 identifies the application 40*a* to be notified of the push information. In S71 and S72, the ACP client 44 provides the message body, which is the push information, to the application 40*a* identified in S70. In S73, the application 40*a* returns, to the ACP client 44, a message indicating that the service based on the push notification has been accepted. In S74 and S75, the arrival of the push information at the application 40*a*, which is the notification destination, is notified to the ACP engine 10*a* and the ACP cloud 110*a*. Then, in S76, a push progress notification indicating the success of the push transmission is sent to the application server 140, which is the transmission source. As a result, in S77, application communication (data communication) between the application 40*a* and the application server 140 starts. In one example, in S77, the application 40*a* transmits the service information requested by the push information to the application server 140.

Transmission of push information according to the above-described push delivery sequence is repeatedly performed by each transmission source within a predetermined retry time limit. In this case, the transmitter of the push information can grasp the state of the destination from the push progress notification or delivery failure notification. Therefore, the transmitter of the push information transmits the push information again when it is within the retry time limit for repeating the transmission of the push information and also when the reason for the failure indicated by the reason information has been resolved. Such a redelivery process can be appropriately executed by the ACP cloud 110a, the ACP engine 10a, and the ACP client 44.

In the embodiment as described above, the receiver (ACP engine 10a), which receives the push information from the transmission source (ACP cloud 110a) outside the vehicle, grasps the ECU information related to the in-vehicle ECU 40 to which the push information is notified. The push information corresponding to this ECU information is notified to the in-vehicle ECU 40. Therefore, the push information can reach the correct destination even when the transmission source of the push information does not grasp in detail information about the in-vehicle ECU 40 such as, for example, the configuration of the in-vehicle system and the on-off state of the power source. Accordingly, it is possible to improve the convenience of push transmission.

In addition, in the present embodiment, the in-vehicle ECU 40 to be the notification destination of the push information is specified from among the multiple in-vehicle ECUs 40. Then, the push information is provided to the specified in-vehicle ECU 40. As described above, when the receiver of the push information can specify the in-vehicle ECU 40 to which the push information is to be notified, the push information can reach the correct in-vehicle ECU 40 even in a situation where the transmission source of the push information does not grasp the detailed configuration of the in-vehicle system.

Further, in the present embodiment, the power source state of the in-vehicle ECU 40, to which push information is notified, is specified. Then, the push information is provided to the in-vehicle ECU 40 in the activated state where the power source is turned on. As described above, when the receiver of the push information provides the push information only to the in-vehicle ECU 40 in the activated state, the push information can reach the correct in-vehicle ECU 40 even in the situation where the transmission source of the push information does not grasp the power source state of the in-vehicle ECU 40.

Further, in the present embodiment, when the power source of the in-vehicle ECU 40 to which the push information is notified is turned off, the activation process for activating the in-vehicle ECU 40 is executed. Then, the push information is provided to the in-vehicle ECU 40 of which power source has been turned on by the activation process. Thereby, for example, even when the power source of the in-vehicle ECU 40 is turned off, such as when the vehicle is parked, the transmitter of the push information can deliver the push information without grasping whether the power source of the in-vehicle ECU 40 is turned on or off. Accordingly, it is possible to further improve the convenience of the push transmission.

In addition, in the present embodiment, the application 40a to be the notification destination of the push information is specified from among multiple applications 40a operating on one in-vehicle ECU 40. Then, the push information is provided to the specified application 40a. As described above, when the in-vehicle ECU 40 can identify the application 40a to be the notification destination of the push information, the push information can reach the correct application 40a in the situation where the transmission source of the push information does not grasp the application configuration in the in-vehicle system. Accordingly, it is possible to further improve the convenience of the push transmission.

Further, in the present embodiment, when the push information does not reach the notification destination, the failure of the push transmission is notified to the transmission source together with the reason information associated with this failure. Therefore, the ACP cloud 110a and the application server 140 can sequentially grasp the state of push delivery without grasping the system configuration for the vehicle. Accordingly, it is possible to further improve the convenience of the push transmission.

Furthermore, in the present embodiment, when the push information reaches the notification destination, the transmission source is notified of the success of the push transmission. Therefore, the ACP cloud 110a and the application server 140 can sequentially grasp the state of push delivery without grasping the system configuration for the vehicle. Accordingly, it is possible to further improve the convenience of the push transmission.

In addition, in the present embodiment, the transmission source (ACP cloud 110a) that transmits the push information can identify the in-vehicle communication device 10 associated with the vehicle Au to be the transmission destination of the push information based on the request information acquired from the request source (application server 140) of the push transmission. In addition, the in-vehicle communication device 10 that receives the push information can specify the in-vehicle ECU 40 that is the notification destination of the push information. Therefore, even when the request source of the push transmission does not grasp, in detail, the information about the vehicle Au and its system configuration, the push information can reach the correct destination. Accordingly, it is possible to improve the convenience of push transmission.

Here, the response required for the push delivery differs depending on the content of the service provided by the push delivery. In one example, when a service for unlocking a door of the vehicle Au is provided, a high response is required for the push delivery for instructing the in-vehicle ECU 40 to unlock the door. On the other hand, the push delivery for mere information notification does not require the high response. Therefore, the ACP cloud 110a can set a retry time limit according to the content of the service implemented by the push delivery, and repeat transmission of the push information within this retry time limit.

Furthermore, in the present embodiment, when the notification of push information fails, the ACP cloud 110a receives reason information associated with the failure. The, when the ACP cloud 110a grasps a fact that the failure reason indicated by the reason information has been resolved, the ACP cloud 110a retransmits the push information within the retry time limit. By performing such a transmission retry, it is possible to increase the success rate of push delivery while maintaining the quality of service using push delivery.

In addition, the ACP cloud 110a of the present embodiment issues a token for specifying the notification destination of push information in association with a combination of IDs that respectively identify the in-vehicle communication device 10, the in-vehicle ECU 40, and the application 40a. Furthermore, the token of the present embodiment includes the application ID. By using the token as described above, it is possible to specify the correct delivery destination of the push information even when duplication may occur in each ID.

In addition, an expiration date is set for the token of the present embodiment. Therefore, in a case of using a shared car or the like where the change of the user occurs, it is possible to perform push delivery limited to the period in which a specific user is using the shared car. As a result, the convenience of push delivery is further improved.

In the above embodiment, the in-vehicle communication device 10 corresponds to a "wireless communication device" and a "communication device", and the destination identification unit 23 corresponds to a "grasping unit". Further, the destination information and the status information correspond to "ECU information", the TCU ID and the ECU ID correspond to "identification information", and the application ID and the token correspond to "request information".

OTHER EMBODIMENTS

Although one embodiment of the present disclosure has been described above, the present disclosure is not construed as being limited to the above-described embodiments, and can be applied to various embodiments and combinations within a scope that does not depart from the spirit of the present disclosure.

In a first modification of the above-described embodiment, only one in-vehicle ECU 40 that operates the application 40a is provided in the in-vehicle system. In such a first modification, the functions of grasping the destination information and specifying the in-vehicle ECU 40 to be the notification destination of the push information from among the multiple in-vehicle ECUs 40 may be omitted from the ACP engine 10a. As described above, the number of in-vehicle ECUs 40 serving as push transmission destinations may be one or more.

In a second modification of the above-described embodiment, the functions of grasping the status information and specifying the power source state of the in-vehicle ECU 40 to be the notification destination of the push information and the processing function of activating the in-vehicle ECU 40 are omitted from the ACP engine 10a.

In a third modification of the above-described embodiment, only one application 40a is installed in the in-vehicle ECU 40. In such a third modification, the function of specifying the application 40a to be the notification destination of the push information from among the multiple applications 40a is omitted from the ACP client 44.

In a fourth modification of the above-described embodiment, part of the function of notifying the ACP cloud 110a of the progress of the push notification and the success of the delivery is omitted. It is desired that such progress monitoring is essential until the progress monitoring by the ACP cloud 110a. On the other hand, notification from the ACP cloud 110a to the application server 140 may be optional in the fourth modification because it depends on the use of push delivery in the service. Further, in the fourth modification, the processes of setting a retry period and repeating push transmission are omitted.

In a fifth modification of the above-described embodiment, the expiration date is not set for the token. Further, in a sixth modification of the above-described embodiment, the token issuing function is omitted. The ACP cloud 110a of the sixth modification specifies the in-vehicle communication device 10 that transmits the push information using the application ID as a key. Further, the ACP engine 10a specifies the in-vehicle ECU 40 that transmits the push information by using the application ID as a key.

In the above embodiment and modifications, the respective functions provided by the in-vehicle communication device 10 and the ACP cloud 110a can be also provided by software and hardware for executing the software, only software, only hardware, and complex combinations of software and hardware. Further, in a case where these functions are provided by electronic circuits as hardware, the functions can be also provided by analog circuits or digital circuits which include a large number of logic circuits.

In the above embodiments, each of the processors 11 and 111 is hardware used for arithmetic processing and coupled with the RAMs 12 and 112, respectively, and is the main configuration of a computer that implements the information transmission method according to the present disclosure. Each of the processors 11 and 111 includes at least one arithmetic core such as a central processing unit (CPU). A processing circuit including the processors 11 and 111 may be configured mainly by FPGA (Field Programmable Gate Array) or ASIC (Application Specific Integrated Circuit).

The storage media 13 and 113 are non-volatile storage media. Each of the storage media 13 and 113 stores various programs (information transmission program and the like) executed by each of the processors 11 and 111. The forms of such storage media 13 and 113 may be appropriately changed. For example, the storage media 13 and 113 are not limited to the configurations provided on the circuit board, and may be provided in the form of a memory card or the like. The storage media may be inserted into a slot portion, and electrically connected to the processing circuits of the in-vehicle communication device 10 and the push server 110. Furthermore, the storage media 13 and 113 may be optical discs, hard disk drives, or the like, which serve as copy sources for the programs.

The controllers and methods thereof described in the present disclosure may be implemented by a special purpose computer which includes a processor programmed to execute one or more functions implemented by computer programs. Alternatively, the device and method described in the present disclosure may be implemented by a special purpose hardware logic circuit. Alternatively, the device and the method described in the present disclosure may be implemented by one or more special purpose computers configured by a combination of a processor executing a computer program and one or more hardware logic circuits. The computer program may be stored, as instructions to be executed by a computer, in a tangible non-transitory computer-readable medium.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:

1. An information transmission method that is used for performing a push transmission of information by wireless communication from an outside of a vehicle to at least one in-vehicle electronic control unit and is executed by at least one processor, the method comprising:

receiving push information from a transmission source positioned in the outside;

grasping electronic control unit information related to the in-vehicle electronic control unit to be a first notification destination of the push information;

determining whether the push information is possible to be transmitted to the first notification destination;

notifying the transmission source of a failure of the push transmission together with first reason information indicating that the first notification destination of the push information disappeared or transmission of the push information to the first notification destination failed due to a change of a user of the vehicle or deletion of an application that is a second notification destination different from the first notification destination in response to transmission of the push information to the first notification destination being impossible, wherein the first reason information is associated with a failure of the push information;

transmitting the push information according to the grasped electronic control unit information to the first notification destination in response to a determination that the transmission of the push information to the first notification destination is possible;

causing the in-vehicle electronic control unit to determine whether the second notification destination is unknown;

receiving, from the in-vehicle electronic control unit, a notification together with second reason information indicating the second notification destination is unknown in response to a determination that the second notification destination is unknown; and transmitting the received second reason information to the transmission source.

2. The information transmission method according to claim 1, wherein the at least one in-vehicle electronic control unit is a plurality of in-vehicle electronic control units, and the method further includes:

when grasping the electronic control unit information, specifying an in-vehicle electronic control unit to be the notification destination of the push information from the plurality of in-vehicle electronic control units; and when performing the notification of the push information, providing the push information to the specified in-vehicle electronic control unit.

3. The information transmission method according to claim 1, further comprising:

when grasping the electronic control unit information, specifying a power source state of the in-vehicle electronic control unit to be the notification destination of the push information; and when performing the notification of the push information, providing the push information to the in-vehicle electronic control unit of which power source is in an on-state.

4. The information transmission method according to claim 3, further comprising:

executing an activation process of activating the in-vehicle electronic control unit when the power source of the in-vehicle electronic control unit to be the notification destination of the push information is in an off-state; and when performing the notification of the push information, providing the push information to the in-vehicle electronic control unit of which power source is in the on-state by the activation process.

5. The information transmission method according to claim 1, further comprising:

specifying an application to be a notification destination of the push information from among a plurality of applications operating on one of the at least one in-vehicle electronic control unit; and providing the push information to the specified application.

6. The information transmission method according to claim 1, further comprising notifying the transmission source of a success of the push transmission when the push information has reached the notification destination.

7. The information transmission method according to claim 1, wherein the push transmission is a transmission performed when the in-vehicle electronic control unit has not requested transmission of the push information.

8. A communication device that receives, in a vehicle including at least one in-vehicle electronic control unit, information transmitted by a push transmission via wireless communication from an outside of the vehicle, the device comprising:

a push receiver configured to receive push information from a transmission source positioned in the outside;

a processor and memory configured to serve as a grasping unit configured to grasp electronic control unit information related to the in-vehicle electronic control unit to be a first notification destination of the push information; and determine whether the push information is possible to be transmitted to the first notification destination;

a progress monitoring unit configured to notify the transmission source of a failure of the push transmission together with first reason information indicating that the first notification destination of the push information disappeared or transmission of the push information to the first notification destination failed due to a change of a user of the vehicle or deletion of an application that is a second notification destination different from the first notification destination in response to transmission of the push information to the first notification destination being impossible, the first reason information being associated with a failure of the push information; and a transmission controller configured to transmit the push information according to the grasped electronic control unit information to the first notification destination in response to a determination that the transmission of the push information to the first notification destination is possible;

wherein:

the processor and memory are further configured to:

cause the in-vehicle electronic control unit to determine whether the second notification destination is unknown; and receive, from the in-vehicle electronic control unit, a notification together with second reason information indicating the second notification destination is unknown in response to determination that the second notification destination is unknown; and the transmission controller transmits the received second reason information to the transmission source.

\* \* \* \* \*